UNITED STATES PATENT OFFICE.

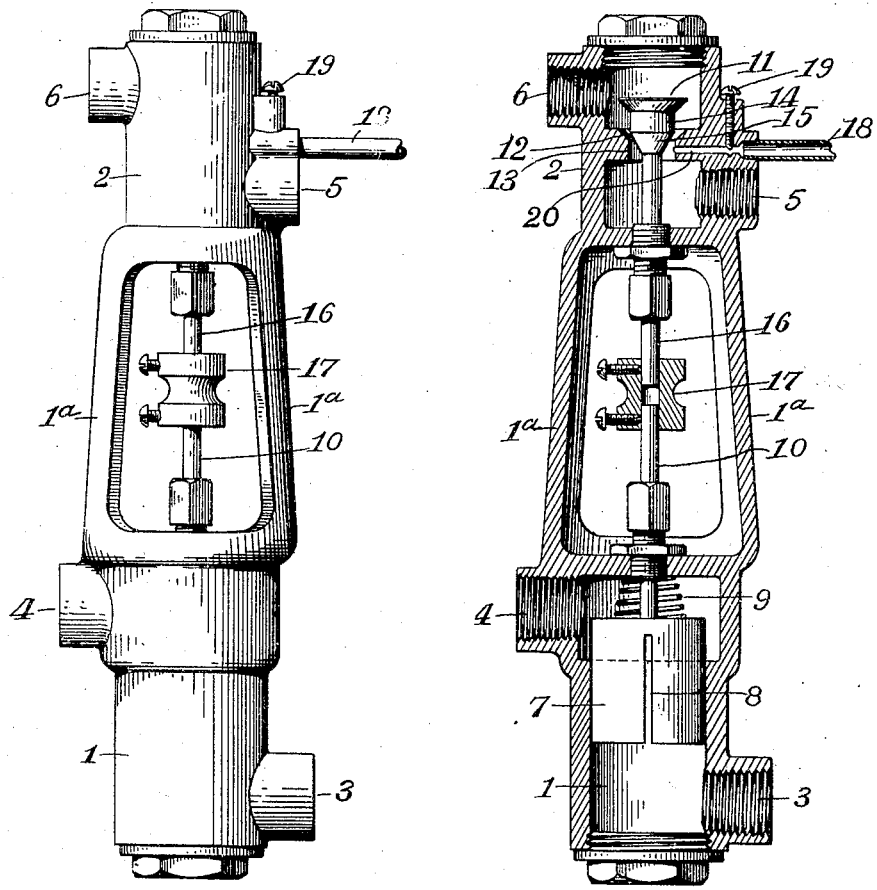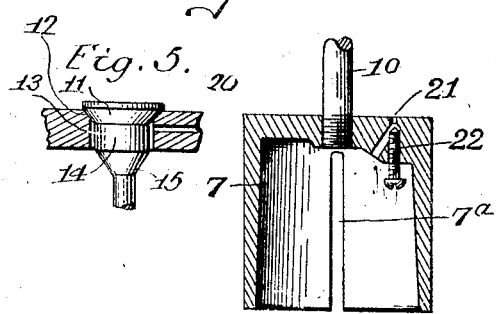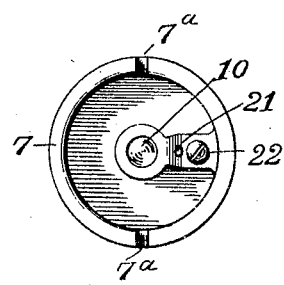

BERT R. PARROTT, OF JACKSON, MICHIGAN.

VALVE FOR WATER-HEATERS.

984,440.

Specification of Letters Patent. Patented Feb. 14, 1911.

Application filed July 11, 1910. Serial No. 571,375.

*To all whom it may concern:*

Be it known that I, BERT R. PARROTT, a citizen of the United States of America, residing at Jackson, in the county of Jackson and State of Michigan, have invented certain new and useful Improvements in Valves for Water-Heaters; and I do hereby declare the following to be a full, clear, and exact description of the invention, such as will enable others skilled in the art to which it appertains to make and use the same.

My invention relates to improvements in automatic valves, for water heaters, and its object is to provide improved means for proportioning the flow of gas to the main burner, according to the quantity of water flowing through the heater, to provide for automatically controlling the pilot-light to reduce the amount of gas flowing thereto when the heater is idle, and to increase the flow of gas to the pilot-light when the main burner is to be lighted and to provide the device with various new and useful features, hereinafter more fully described and particularly pointed out in the claims.

My device consists essentially of a piston adjusted by the water flowing through the device and a gas valve of novel construction, adjusted by said piston, to control the flow of gas to the main burner and to proportion the same to the flow of water, and also to throttle down the pilot-light to a minimum whenever the water is not flowing through the device, and in various features of construction and arrangement, as will more fully appear by reference to the accompanying drawings, in which;—

Figure 1 is a side elevation of a device embodying my invention; Fig. 2 a vertical section of the same; Fig. 3 an enlarged sectional detail of the piston; Fig. 4 an inverted plan view of the same; and Fig. 5 is a detail of the gas valve closed.

Like numbers refer to like parts in all of the figures.

1 represents a cylinder, and 2 a valve case connected by a yoke 1ª, whereby they are sure to remain in accurate alinement.

3 is the water inlet at the bottom of the cylinder 1, and 4 the outlet at the top of the same.

5 is the gas inlet at the bottom of the valve chamber 2 and 6 the gas outlet at the top of the said chamber. The gas is piped to the main burner from the outlet 6, and from a supply to the inlet 5, the water to be heated is piped from any suitable supply to the opening 3, and to the heater (not shown) from the opening 4.

The drawing shows the device with the parts positioned as when a moderate stream of water is flowing through to be heated.

7 is an inverted cup-shaped piston movable in the cylinder 1, the upper part of which cylinder is of enlarged diameter, and the lower part fitted closely about the piston. In the wall of the piston are longitudinal slots 7ª which permit the water below the piston to escape therethrough in greater or lesser quantities as the piston rises more or less. The greater the flow of water, the higher this piston rises. A spring 9 engages the piston and moves the same downward as the flow of water ceases.

To promptly equalize the pressure at each side of the piston and permit the spring to thus act, a small vent 21 is provided in the piston, closed more or less by a screw 22 to adjust the flow therethrough. A rod 10 attached to the piston, extends upward through a suitable gland, and is adjustably coupled to a like rod 16 by an adjustable coupling 17 to operate the gas valve. The valve chamber is divided by a horizontal partition into lower and upper chambers, respectively communicating with the openings 5 and 6. In this partition is a tubular opening 13 having a valve seat 12 at the top. The valve is provided with a closing member 11 to engage the seat 12, and wholly stop the flow of gas to the main burner whenever water ceases to flow through the piston and the same descends. Below the closing member 11 is a cylindrical portion 14 fitting loosely in the cylindrical opening when lowered within the same, whereby the flow of gas to both the pilot-light and burner is throttled, but not wholly shut off. 18 is a tube extending to the pilot-light, and communicating with the tubular opening 13, by a small passage 20, and 19 is a screw in the said passage to adjust the maximum flow therethrough.

In operation;—when water is drawn through the heater it reduces the pressure above the piston, permits the same to rise, and compress the spring 9 more or less according to the amount of water passing through the slots 7ª. This opens the gas valve and first turns on the maximum flow of gas to the pilot light and a moderate flow of gas to the burner, and after ignition at the burner as the gas valve rises further the conical part 15, comes opposite the seat 12 and thus the space between the same is increased. The gas is thus turned on to the main burner more or less according as more or less water is drawn through the piston. The proportion of gas and water is adjusted as occasion requires, by adjusting the coupling 17 to change the fixed distance between the water piston and the gas valve. Whenever the water ceases to flow and hold up the piston the spring 9 lowers the piston and closes the gas valve, wholly shutting off the main burner and throttling the pilot light to a minimum whereby but little gas is required to keep it burning and ready for action whenever water is drawn through the device again.

It will be noted that the cylindrical portion 14 of the valve while in the tubular portion 13 of the partition checks the admission of gas to the burner so that but a limited amount is admitted at first, and that the pilot-light is turned on fully before the burner supply is materially increased. This prevents any explosive lighting of the burner. Also, that the valve determines the reduced flow to the pilot-light and the screw 19, adjusts the maximum flow to the same.

What I claim is:—

1. A water heater valve, comprising a valve case having a main passage to admit gas to the main burner, and a lateral opening communicating with the main passage to admit gas to a pilot-light; a valve adapted to wholly close the main passage to simultaneously partially close the lateral opening to shut off the flow to the main burner and determine the minimum flow to the pilot-light, and adjustable means in the lateral passage to determine the maximum flow to the pilot-light when the valve is opened.

2. A water heater valve, comprising a valve case having a main opening to admit gas to a burner and a lateral opening communicating with the main opening to admit gas to a pilot-light, a valve adapted to wholly close the main opening, and partially close the lateral opening when said valve is closed and to first wholly open the lateral opening and then to variably open the main opening, and means for automatically opening and closing said valve.

3. A water valve, comprising a valve casing, having a partition therein provided with a tubular opening having a valve seat at one end, and a lateral opening communicating with the tubular opening; a valve having a closing member to engage the seat, a throttling cylindrical portion and an adjusting conical portion movable within the tubular opening and out of the same to a position with the conical portion opposite the valve seat and means for adjusting said valve.

4. A water heater valve, comprising a valve case having inlet and outlet openings at opposite ends, a partition in said case having an axial opening and a valve seat at one end, said case also having a lateral passage, communicating with the axial opening; an adjustable member in said passage to control the maximum flow therethrough, a valve, movable in said axial opening, adapted at one end to engage the seat and wholly close said opening and having a middle portion adapted to partially close both the opening and the passage, and having a conical end, adapted to variably adjust and control the flow through the axial opening, and means for automatically opening and closing the valve.

5. A water heater valve comprising a gas valve having a closing member at one end to wholly shut off gas from the main burner, a cylindrical middle portion to throttle the pilot-light, and a conical portion at the other end to regulate the flow of gas to the main burner, a casing having inlet and outlet openings at its respective ends, a partition in the casing having a tubular opening and a valve seat at one end of said opening, and also having a passage for a pilot light communicating with said opening, and means for adjusting the maximum flow of gas to the pilot-light through the lateral opening.

6. A water heater valve, comprising a valve chamber having a partition and inlet and outlet openings at the respective sides of the partition, said partition also having a main opening therethrough and a lateral opening to admit gas to a pilot light, a valve adapted to wholly close the main opening and to partially close the lateral opening when closed, and to wholly open the lateral opening and adjust the main opening when opened, and means for adjusting the maximum flow of gas to the pilot-light.

In testimony whereof I affix my signature in presence of two witnesses.

BERT R. PARROTT.

Witnesses:
ALBERT P. REECE,
FRANCES M. ADAMS.